Nov. 18, 1941.  J. S. ANDREWS  2,263,116

EYEGLASSES FOR WELDERS' HELMETS

Filed Aug. 8, 1940  2 Sheets-Sheet 1

Inventor
John S. Andrews

By Clarence A. O'Brien
Attorney

Inventor
John S. Andrews
By Clarence A. O'Brien
Attorney

Patented Nov. 18, 1941

2,263,116

UNITED STATES PATENT OFFICE 2,263,116

EYEGLASSES FOR WELDERS' HELMETS

John S. Andrews, Baltimore, Md.

Application August 8, 1940, Serial No. 351,789

2 Claims. (Cl. 2—8)

This invention relates to an eyeglass attachment for a welder's helmet, the general object of the invention being to provide the helmet with lenses made to suit the eyes of the welder using the helmet so that he will not need to use his regular eyeglasses.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which.

Figure 1:
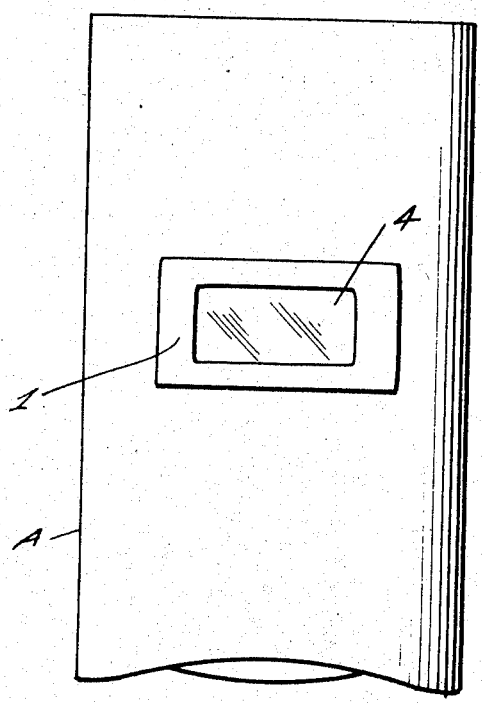
Figure 1 is an elevation of the helmet provided with the invention.
Figure 2:
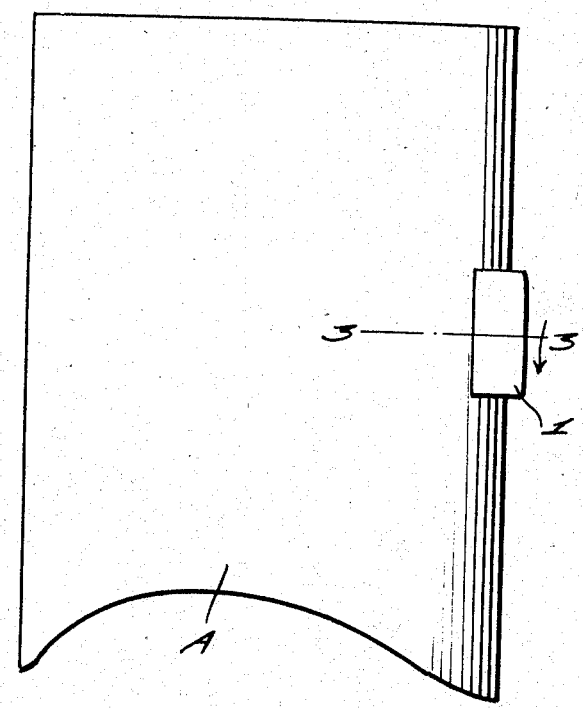
Figure 2 is a side view thereof.
Figure 3:
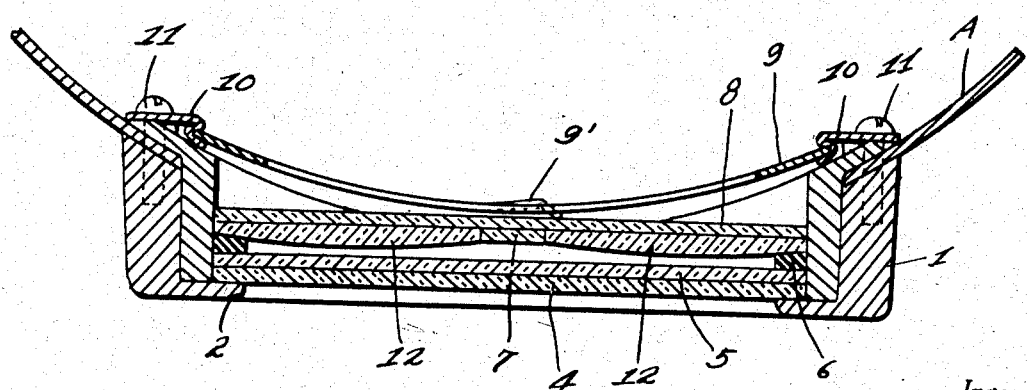
Figure 3 is a section on the line 3—3 of Figure 2.
Figure 4:
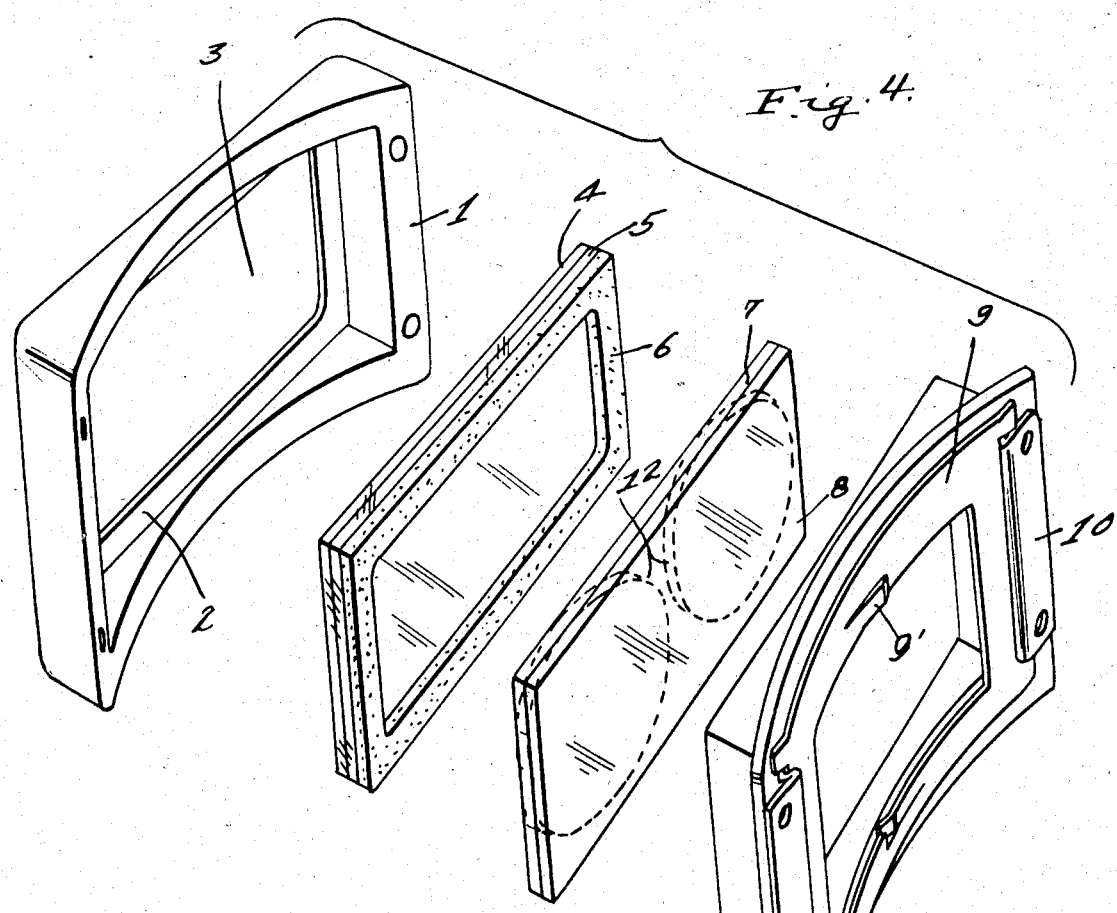
Figure 4 is a view of the glass carrying member of the helmet with the parts thereof separated and showing the lens carrying member.
Figures 5, 6:
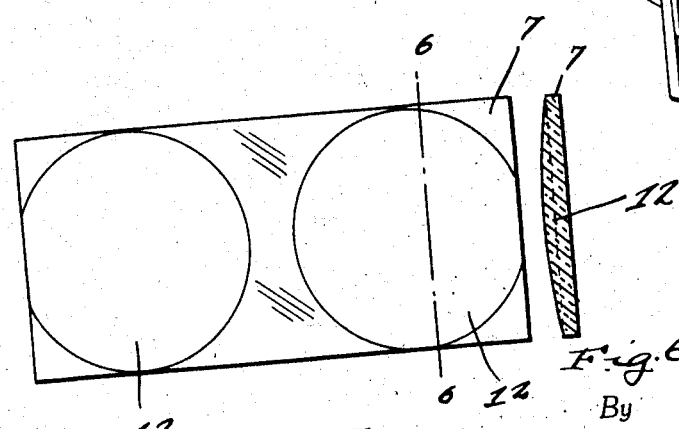
Figure 5 is a face view of the lens carrying member.
Figure 6 is a section on the line 6—6 of Figure 5.

In these views the letter A indicates the helmet which may be of any suitable construction and the numeral 1 indicates the window frame of the helmet and through which the welder looks during the welding operation. This member is fastened to the helmet and covers an opening formed therein and it is formed with a flange 2 which surrounds the opening 3 in the frame. A clear piece of glass 4 fits against the flange and covers the opening and a dark glass 5 rests against the inner face of the glass 4. A gasket 6 rests against edge portions of the glass 5 and my improved lens carrying glass 7 rests against the gasket and this lens carrying member has a clear piece of glass 8 resting against its inner face. These parts are held in place by the rectangular spring frame 9 held in place by the clips 10 which are fastened to parts of the frame 1 by the screws 11. The frame 9 is formed with the spring fingers 9' for resting against central portions of the glass 8.

The glass 7 has holes therein and a pair of lenses 12 are fitted in the holes and are suitably fastened therein either by cement or heating, etc. These lenses are, of course, made to suit the eyes of the welder using the helmet. In other words, they are made similar to the lenses that he uses in his glasses.

Thus with this invention the welder does not need to use his regular glasses but can remove them when he is using the helmet as the lenses 12 will enable him to clearly see the work being performed.

Thus with this invention perspiration or moisture cannot reach the lenses of the device as it does when the welder wears glasses and these lenses cannot get in the way of the welder and they will give the eyes the same protection as regular glasses and the welder can readily wipe his face to remove perspiration and the like without the bother of removing his glasses and then placing his glasses back in place.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a welder's helmet having a window therein, a plain transparent member extending across the window, a dark translucent member extending across the window in rear of the first member, a transparent plate extending across the window in rear of the translucent member, said plate having a pair of circular openings therein, eyeglass lenses fastened in the openings and a plain transparent member extending across the window in rear of the lens carrying member and means for holding the members in position.

2. In combination with a welder's helmet having a window therein and substantially transparent members passing across the window, a transparent plate located between some of the first-mentioned members and having a pair of circular holes therein and eyeglass lenses held in said holes.

JOHN S. ANDREWS.